United States Patent
You et al.

(10) Patent No.: US 11,720,829 B2
(45) Date of Patent: Aug. 8, 2023

(54) PERSONAL MOBILITY RESERVATION SYSTEM AND RESERVATION METHOD OF PERSONAL MOBILITY

(71) Applicants: Hyundai Motor Company, Seoul (KR); Kia Motors Corporation, Seoul (KR)

(72) Inventors: Kyungjin You, Anyang-si (KR); Nahyeon Pak, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 192 days.

(21) Appl. No.: 17/071,333

(22) Filed: Oct. 15, 2020

(65) Prior Publication Data

US 2021/0312340 A1  Oct. 7, 2021

(30) Foreign Application Priority Data

Apr. 7, 2020 (KR) .................. 10-2020-0042191

(51) Int. Cl.
*G06Q 10/02* (2012.01)
*H04W 4/12* (2009.01)
*G06Q 30/0645* (2023.01)
*G06Q 10/20* (2023.01)
*H04W 4/021* (2018.01)

(52) U.S. Cl.
CPC ............ *G06Q 10/02* (2013.01); *G06Q 10/20* (2013.01); *G06Q 30/0645* (2013.01); *H04W 4/021* (2013.01); *H04W 4/12* (2013.01)

(58) Field of Classification Search
CPC .... G06Q 10/02; G06Q 10/20; G06Q 30/0645; H04W 4/021; H04W 4/12

USPC ............................................................ 705/5
See application file for complete search history.

(56) References Cited

U.S. PATENT DOCUMENTS

| 9,367,217 | B2 | 6/2016 | Moore, Jr. |
| 10,531,318 | B1 * | 1/2020 | Verma ................... H04W 24/02 |
| 11,291,921 | B1 * | 4/2022 | Schindler .............. H04L 67/131 |
| 2018/0315147 | A1 * | 11/2018 | Mendels ................ G06Q 50/30 |

(Continued)

FOREIGN PATENT DOCUMENTS

| KR | 20150087890 A | 7/2015 |
| KR | 20160087289 A | 7/2016 |
| KR | 101813475 B1 | 12/2017 |

OTHER PUBLICATIONS

Is "Identifying E-Scooter Sharing Customer Segments using Clustering" Published by IEEE (Year: 2018).*

*Primary Examiner* — Zeina Elchanti
(74) *Attorney, Agent, or Firm* — Slater Matsil, LLP (57) ABSTRACT

A personal mobility reservation system comprises a user terminal, a personal mobility and a server connected to the user terminal and the personal mobility through a network, wherein the server is configured to obtain user information from the user terminal, to obtain device information from the personal mobility, to generate recommended reservation information based on at least two of the user information, the device information and traffic information, to transmit the recommended reservation information to the user terminal, and to perform a reservation of the personal mobility based on a reservation request signal received from the user terminal regarding the recommended reservation information.

20 Claims, 10 Drawing Sheets

(56) References Cited

U.S. PATENT DOCUMENTS

| | | | |
|---|---|---|---|
| 2019/0376802 A1* | 12/2019 | Whitt | G06Q 10/02 |
| 2020/0400446 A1* | 12/2020 | Beaurepaire | G01C 21/3415 |
| 2020/0402150 A1* | 12/2020 | Gardner | G06Q 50/30 |
| 2021/0035251 A1* | 2/2021 | Wen | G06Q 30/0631 |
| 2022/0012649 A1* | 1/2022 | Unagami | H02J 7/02 |

* cited by examiner

FIG.10

PERSONAL MOBILITY RESERVATION SYSTEM AND RESERVATION METHOD OF PERSONAL MOBILITY

CROSS-REFERENCE TO RELATED APPLICATIONS

This application claims priority to Korean Patent Application No. 10-2020-0042191, filed on Apr. 7, 2020, which application is hereby incorporated herein by reference.

TECHNICAL FIELD

The disclosure relates to a personal mobility reservation system and a reservation method of a personal mobility.

BACKGROUND

Recently, as the market for a personal mobility corresponding to a single-person mobility means powered by electricity has increased, the number of users using personal mobility on the road has increased.

In general, the user runs an application before renting a personal mobility, searches for a personal mobility in the vicinity of the current location, and then moves to the location where the personal mobility is located. However, there may be a case where the target personal mobility cannot be found because there may be an error in the location of the personal mobility, and another user may borrow the personal mobility while the user moves to the location.

In addition, when there is a high demand for a personal mobility (for example, a rush hour), difficulties may arise in occupying the personal mobility.

SUMMARY

The disclosure relates to a personal scooter reservation system and a reservation method of a personal mobility. It is an aspect of embodiments of the present disclosure to provide a personal mobility reservation system that may predict a scenario related to rental of a personal mobility using a user's schedule and usage history, and recommend reservation of a personal mobility suitable for a user and a reservation method of a personal mobility.

In addition, it is another aspect of embodiments of the present disclosure to provide a personal mobility reservation system that may reduce the hassle of a user searching for a personal mobility and prevent rental failure and a reservation method of a personal mobility.

In accordance with an embodiment of the disclosure, a personal mobility reservation system includes a user terminal, a personal mobility and a server connected through a network, and the server is configured to obtain user information from the user terminal, obtain device information from the personal mobility, generate recommended reservation information based on at least two of the user information, the device information and traffic information, transmit the recommended reservation information to the user terminal and perform a reservation of the personal mobility based on a reservation request signal regarding the recommended reservation information received from the user terminal.

The server may be configured to generate the recommended reservation information based on schedule data and usage history data included in the user information, and location information and battery information of the personal mobility included in the device information.

The server may be configured to transmit a push message providing a notification regarding the recommended reservation information to the user terminal before an application is executed in the user terminal.

The server may be configured to predict a rental time point based on the user information and transmit the push message to the user terminal at a time ahead of the predetermined rental time point from the predicted rental time point.

The server may be configured to transmit list data of the recommended reservation information to the user terminal when the application is executed in the user terminal.

The server may be configured to set a reservation execution time and a reservation maintenance time based on the user information and the device information when receiving the reservation request signal.

The server may be configured to calculate the reservation maintenance time based on the distance from the location of the user terminal to the personal mobility.

The server may be configured to confirm the allocation of the personal mobility at the reservation execution time.

The server may be configured to cancel the reservation regarding the personal mobility when a rental signal is not received from the user terminal during the reservation maintenance time or when a cancellation signal of the reservation execution is received from the user terminal during the reservation maintenance time.

The recommended reservation information may include a destination predicted based on the user information, a driving route to the destination, and an estimated rate.

In accordance with an embodiment of the disclosure, a reservation method of a personal mobility performed by a user terminal, a personal mobility and a server connected through a network includes obtaining user information from the user terminal, obtaining device information from the personal mobility, generating, by the server, recommended reservation information based on at least two of the user information, the device information and traffic information, transmitting, by the server, the recommended reservation information to the user terminal, receiving, by the server, a reservation request signal for the recommended reservation information from the user terminal, and performing, by the server, a reservation of the personal mobility based on the reservation request signal.

The generating the recommended reservation information may include generating the recommended reservation information based on schedule data and usage history data included in the user information, and location information and battery information of the personal mobility included in the device information.

The transmitting the recommended reservation information may include transmitting a push message providing a notification regarding the recommended reservation information to the user terminal before an application is executed in the user terminal.

The transmitting the push message may include predicting a rental time point based on the user information, and transmitting the push message to the user terminal at a time ahead of the predetermined rental time point from the predicted rental time point.

The transmitting the recommended reservation information may include transmitting list data of the recommended reservation information to the user terminal when the application is executed in the user terminal.

The performing the reservation of the personal mobility may include setting a reservation execution time and a reservation maintenance time based on the user information and the device information when receiving the reservation request signal.

The setting the reservation maintenance time may include calculating the reservation maintenance time based on the distance from the location of the user terminal to the personal mobility.

The performing the reservation of the personal mobility may include confirming the allocation of the personal mobility at the reservation execution time.

The performing the reservation of the personal mobility may include: canceling the reservation regarding the personal mobility when a rental signal is not received from the user terminal during the reservation maintenance time or when a cancellation signal of the reservation execution is received from the user terminal during the reservation maintenance time.

The recommended reservation information may include a destination predicted based on the user information, a driving route to the destination, and an estimated rate.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF ILLUSTRATIVE EMBODIMENTS

Like reference numerals refer to like elements throughout the specification. Not all elements of embodiments of the disclosure will be described, and description of what are commonly known in the art or what overlap each other in the embodiments will be omitted.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

As used herein, the terms "portion," "unit," "block," "member," and "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

Hereinafter, exemplary embodiments of the present invention will be described in detail with reference to the accompanying drawings.

Figure 1:
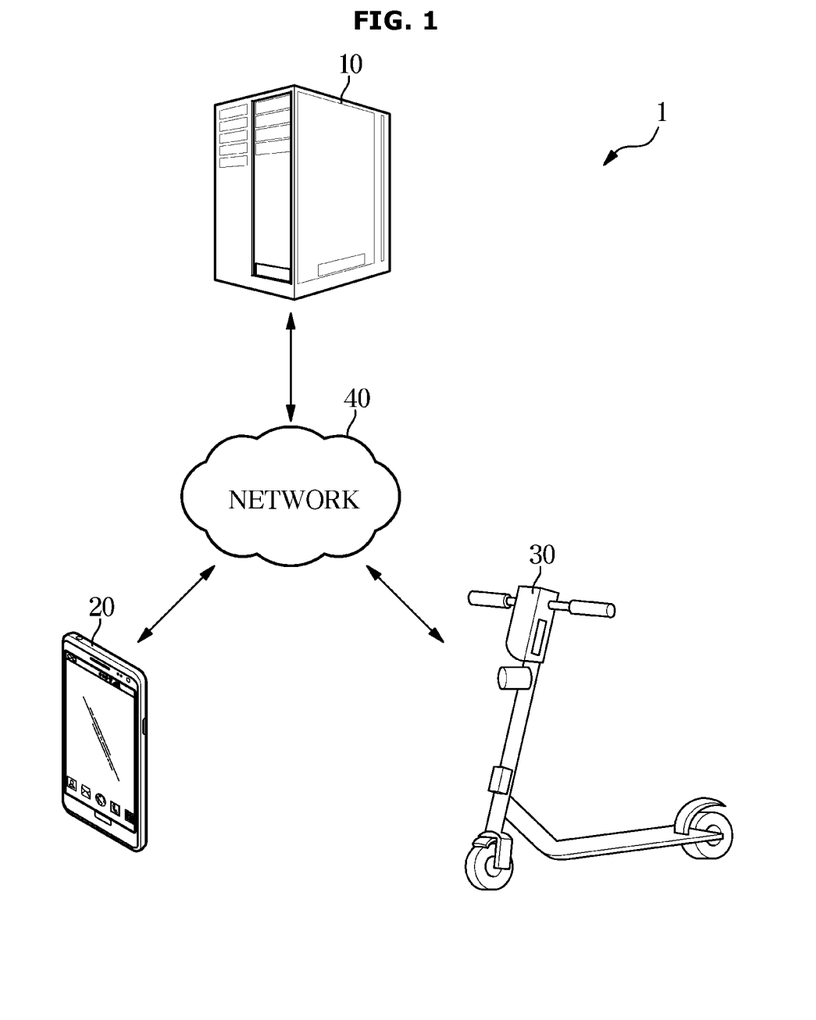
FIG. 1 illustrates a personal mobility reservation system according to an embodiment.

FIG. 1 illustrates a personal mobility reservation system according to an embodiment.

Referring to FIG. 1, a personal mobility reservation system 1 according to an embodiment may include a server 10, a user terminal 20 and a personal mobility 30. The server 10 corresponds to a computing device. The server 10, the user terminal 20, and the personal mobility 30 may be connected through a network 40. Specifically, the server 10 may communicate with the user terminal 20 and the personal mobility 30 using wireless communication and/or wired communication.

Wireless communication may include 5G (5th Generation), LTE, LTE Advance (LTE-A), Code Division Multiple Access (CDMA), Wideband CDMA (WCDMA), Universal Mobile Telecommunications System (UMTS), wireless broadband (WiBro), or Global System for Mobile communications (GSM).

Wired communication may include Universal Serial Bus (USB) communication, High Definition Multimedia Interface (HDMI) communication, Recommended Standard-232 (RS-232) communication, power line communication, or Plain Old Telephone Service (POTS) communication. The network may include a telecommunications network, a computer network (e.g., LAN or WAN), the Internet, or a telephone network.

The user terminal 20 may be a mobile terminal or a fixed terminal. Mobile terminals are easy to carry and portable electronic devices, such as video phones, mobile phones, smart phones, WCDMA (Wideband Code Division Multiple Access) terminal devices, UMTS (Universal Mobile Telecommunication Service) terminal devices, Personal Digital Assistants (PDAs), Portable Multimedia Players (PMPs), Digital Multimedia Broadcasting (DMB) terminal devices, E-Books, portable computers (laptops, Tablets, etc.) or digital cameras. The fixed terminal is an electronic device that may be fixed and used in a specific location, and may include a desktop personal computer, a smart TV, and the like.

The user terminal 20 may include a display. The user terminal 20 may display various information related to the operation of the personal mobility 30. The user terminal 20 may display a user interface. The user interface may be a graphical user interface (GUI). The display of the user terminal 20 may be implemented as a light emitting diode (LED) panel, an organic light emitting diode (OLED) panel, or a liquid crystal display panel. The display may also include a touch panel.

Each of the server 10 and the user terminal 20 may be installed with applications and/or programs for performing reservation of the personal mobility 30.

Another name for the personal mobility 30 may be an electric scooter. The personal mobility 30 may include a handle axle, scaffold, handlebar, wheel, radar, front light, audio device and display. In addition, the personal mobility 30 may include a rear wheel cover, motor, braking device, suspension, brake lever, pressure sensor, rear light and haptic device.

The personal mobility 30 may include various sensors. Sensors may collect device information of the personal mobility 30. For example, the personal mobility 30 may include at least one of a speed sensor to measure the speed, a pressure sensor that measures the pressure applied to the handlebar, a gyro sensor to measure tilt, a location sensor to obtain geopolitical location information, a lock sensor for detecting whether it is locked or not, or a battery sensor for measuring the battery capacity. The personal mobility 30 may also include other sensors than those described above.

Figure 2:
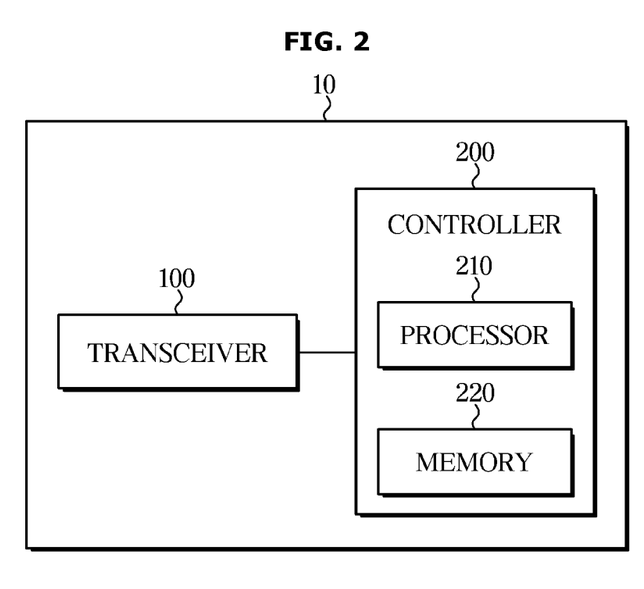
FIG. 2 is a control block diagram of a server according to an embodiment.

FIG. 2 is a control block diagram of a server according to an embodiment.

Referring to FIG. 2, the server 10 may include a transceiver 100 and a controller 200. The transceiver 100 may communicate with the user terminal 20 and the personal mobility 30 under the control of the controller 200. The transceiver 100 may use various communication methods described above.

The controller 200 may include a memory 220 in which programs and/or applications related to the reservation of the personal mobility 30 are stored, and a processor 210 executing the stored programs and/or applications. The memory 220 and the processor 210 may be integrated on one chip. Also, the memory 220 and the processor 210 may be provided in physically separate locations. In addition, a plurality of the memories 220 and the processors 210 may be provided, respectively.

The memory 220 may include non-volatile memory element such as cache, read only memory (ROM), programmable ROM (PROM), erasable programmable ROM (EPROM), electrically erasable programmable ROM (EEPROM), and flash memory. Further, the memory 220 may include a volatile memory element such as random access memory (RAM), and may include a storage medium such as a hard disk drive (HDD) or a CD-ROM. The type of memory 220 is not limited to that illustrated.

On the other hand, although not shown, the user terminal 20 and the personal mobility 30 may also include a transceiver and a controller, respectively.

Hereinafter, the operation of the personal mobility reservation system according to an embodiment will be described in detail.

Figure 3:
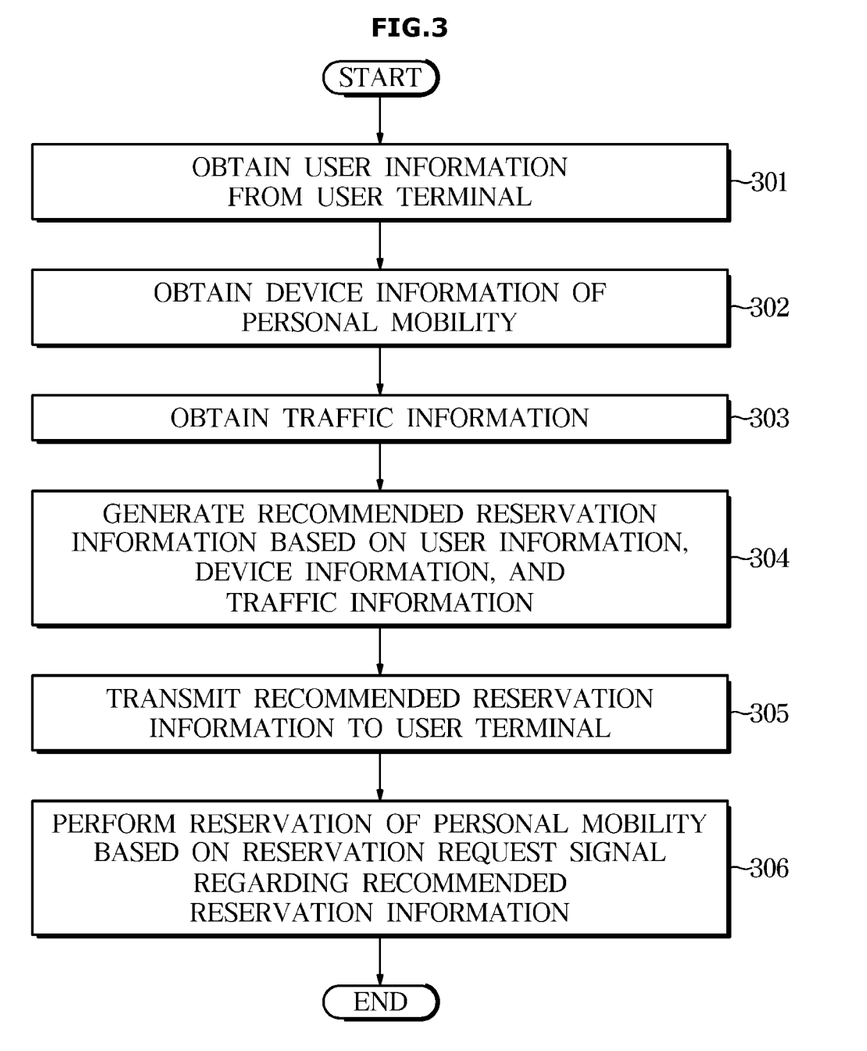
FIGS. 3 and 4 are flowcharts illustrating a reservation method of a personal mobility according to an embodiment.
Figure 4:
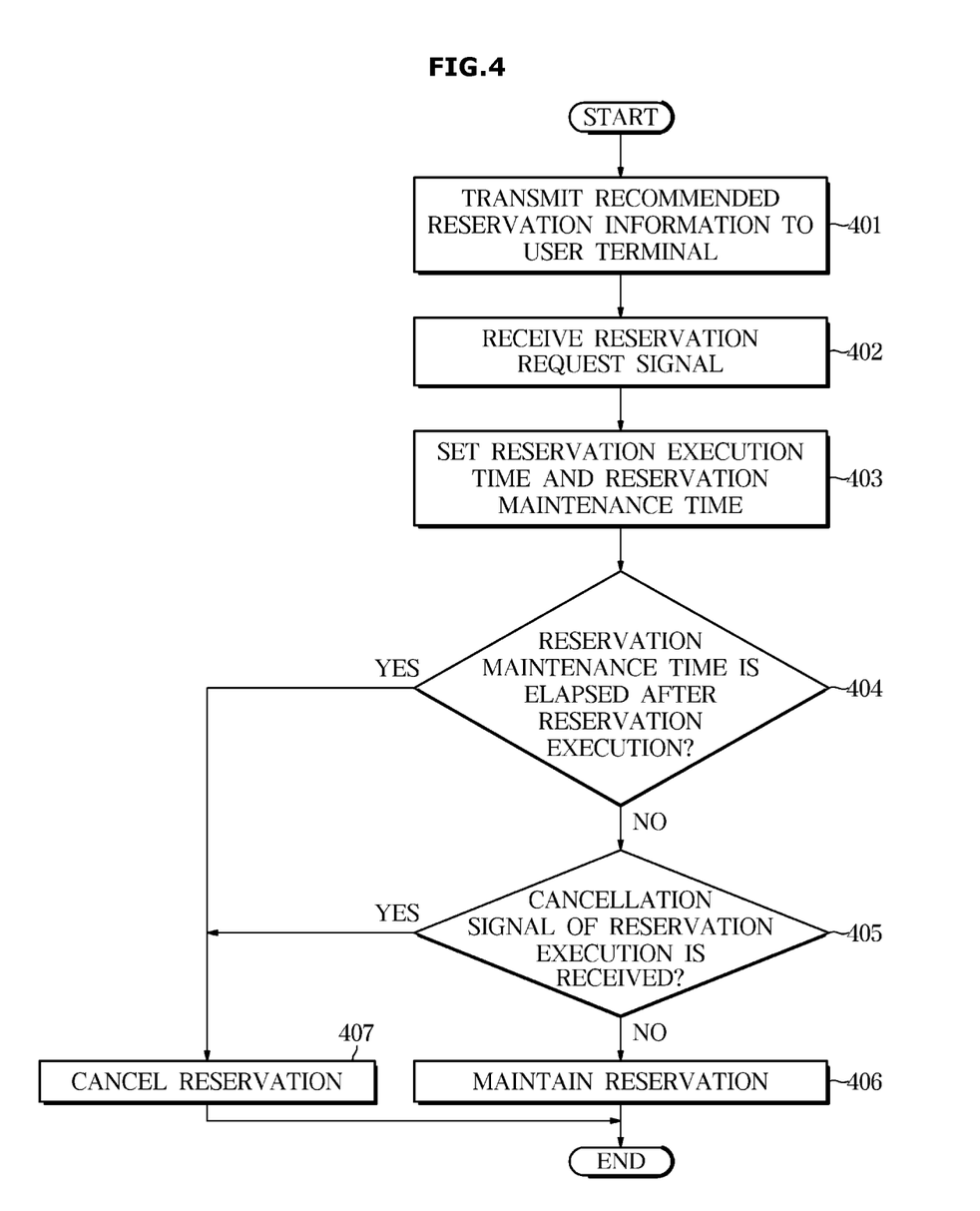

FIGS. 3 and 4 are flowcharts illustrating a reservation method of a personal mobility according to an embodiment.

Referring to FIG. 3, the server 10 may obtain user information from the user terminal 20 (301). The user information may include schedule data and usage history data. The schedule data means data related to the user's schedule. The schedule data includes information about the scheduled event. For example, schedule data may include a place to be visited by a user and an arrival time for the corresponding place.

The usage history data may include past reservation information and past rental information. The rental information may include a rental location, a rental time, a travel route, a return location, a return time and payment information.

In addition, the user information may include a name, nickname, phone number, gender, date of birth and ID.

The server 10 may obtain device information from the personal mobility 30 (302). The device information may include location information of personal mobility 30 and battery information. The battery information includes the available battery capacity. Also, the device information may include a total number of times of driving, a total driving distance, a failure state, a reservation state, and the like.

In addition, the server 10 may obtain traffic information (303). The traffic information may include road traffic congestion information. The server 10 may obtain traffic information from an external device such as a traffic information collection device.

The server 10 may generate recommended reservation information based on at least two of user information, device information, and traffic information (304). Specifically, the server 10 may generate recommended reservation information based on schedule data and usage history data included in the user information, and location information and battery information of the personal mobility 30 included in the device information. The server 10 may predict or determine a destination based on the user information. In addition, the server 10 may predict the rental time point based on the user information.

The recommended reservation information may include a destination predicted based on the user information, a driving route to the destination, and an estimated rate. Also, the recommended reservation information may further include schedule information. The server 10 may update recommended reservation information every predetermined time (tracking time). For example, the server 10 may update recommended reservation information every 10 minutes. This is because the personal mobility 30 that may be reserved may be changed.

The server 10 may generate a plurality of the recommended reservation information based on the schedule data of the user. When there are multiple events included in the schedule data, the server 10 may generate recommended reservation information corresponding to each event. The user may select one of a plurality of recommended reservation information to proceed with the reservation.

On the other hand, when user information is not obtained from the user terminal 20, the server 10 may generate recommended reservation information including device information of the personal mobility 30 at the shortest distance from the current location of the user terminal 20 based on the usage rate for each time period of the personal mobility 30. That is, the personal mobility 30 at the shortest distance at the time when the usage rate is highest may be recommended to the user.

The server 10 may transmit recommended reservation information to the user terminal 20 (305). The controller 200 of the server 10 may control the transceiver 100 to transmit recommended reservation information to the user terminal 20.

In addition, the server 10 may transmit a push message providing a notification regarding recommended reservation information to the user terminal 20 before the application is executed in the user terminal 20. The server 10 may predict a rental time point based on user information, and transmit a push message to the user terminal 20 at a time ahead of the predetermined time from the predicted rental time point. For example, server 10 may send a push message 10 minutes before the predicted rental time point.

The user terminal 20 may receive recommended reservation information from the server 10 and provide notification regarding recommended reservation information. The user terminal 20 may output a push message transmitted from the server 10 through a display.

When the application is executed in the user terminal 20, the server 10 may transmit list data of recommended reservation information to the user terminal 20. The user terminal 20 may output a list of recommended reservation information through a display.

The server 10 may perform reservation of the personal mobility 30 based on the reservation request signal regarding recommended reservation information received from the user terminal 20 (306). When receiving the reservation request signal, the server 10 may set reservation execution time and reservation maintenance time based on user information and device information.

As illustrated in FIG. 4, the server 10 may transmit recommended reservation information to the user terminal 20 (401). The controller 200 of the server 10 may control the transceiver 100 to transmit recommended reservation information to the user terminal 20.

In addition, the server 10 may transmit a push message providing a notification regarding recommended reservation information to the user terminal 20 before the application is executed in the user terminal 20. The server 10 may predict a rental time point based on user information, and transmit a push message to the user terminal 20 at a time ahead of the predetermined time from the predicted rental time point. For example, server 10 may send a push message 10 minutes before the predicted rental time point.

The user terminal 20 may receive recommended reservation information from the server 10 and provide notification regarding recommended reservation information. The user terminal 20 may output a push message transmitted from the server 10 through a display.

When the application is executed in the user terminal 20, the server 10 may transmit list data of recommended reservation information to the user terminal 20. The user terminal 20 may output a list of recommended reservation information through a display.

The server 10 may receive a reservation request signal from the user terminal 20 (402). When receiving the reservation request signal, the server 10 may set reservation execution time and reservation maintenance time based on user information and device information (403).

The reservation execution time is the time at which the reservation is confirmed, and means the time at which the allocation of the personal mobility 30 is confirmed. In other words, the server 10 may confirm the allocation of the personal mobility 30 at the reservation execution time. For example, when the reservation request signal is received from the user terminal 20, the server 10 may confirm the reservation after the grace time. The grace time may be determined in advance based on schedule data or may be input by the user terminal 20. In addition, the server 10 may set a time point when a reservation request signal is received from the user terminal 20 as a reservation execution time.

Reservation maintenance time means the time that the reservation is maintained after reservation execution (confirmation). The server 10 may calculate the reservation maintenance time based on the distance from the location of the user terminal 20 to the personal mobility 30. This takes into account the time it takes for the user to move to the personal mobility 30. That is, during the reservation maintenance time, other users may not use or reserve the same personal mobility 30.

When a rental signal is not received from the user terminal 20 during the reservation maintenance time (YES to 404) or when a cancellation signal of the reservation confirmation is received from the user terminal 20 during the reservation maintenance time (YES to 405), the server 10 may cancel the reservation regarding the personal mobility 30 (407). When the reservation maintenance time is not elapsed after reservation execution (NO to 404) and no cancellation signal of the reservation execution is received (NO to 405), the reservation is maintained (406).

It may be understood that the above-described reservation method of a personal scooter is performed by the controller 200 of the server 10.

Figure 5:
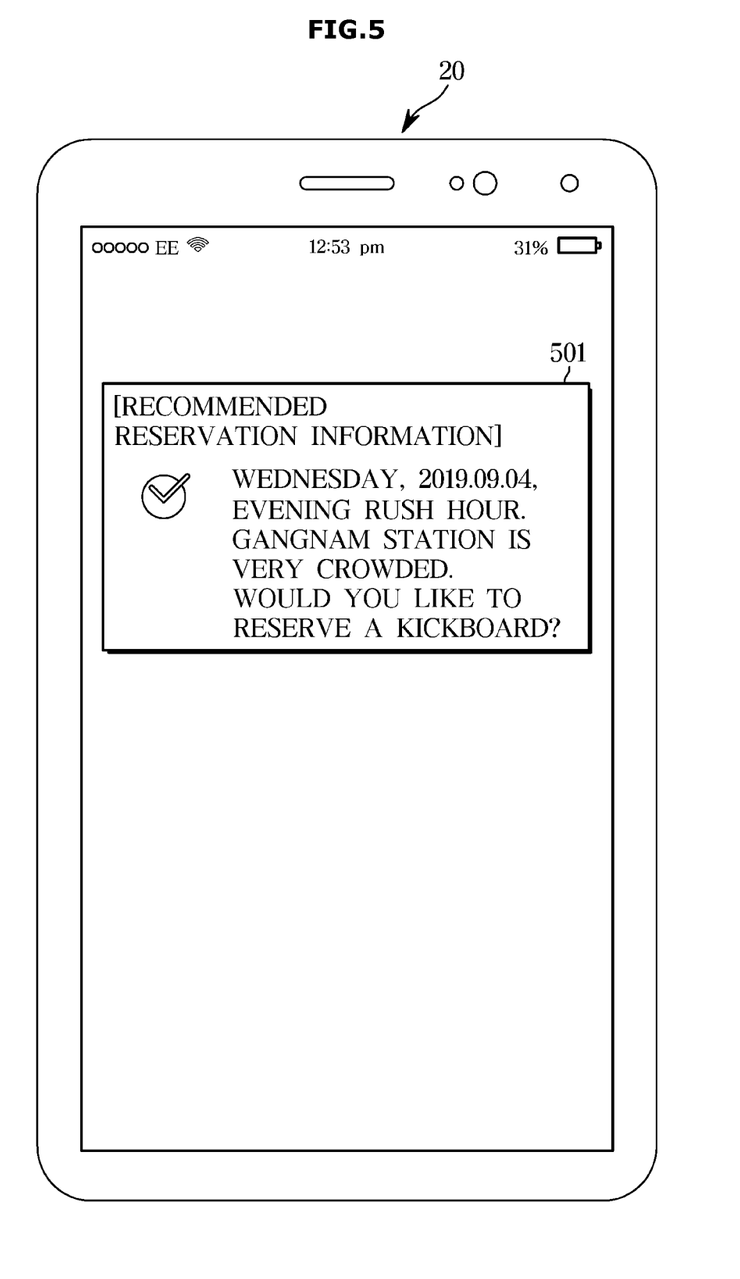
FIGS. 5 and 6 illustrate an example of a screen in which a push message is displayed before an application is executed in a user terminal.
Figure 6:
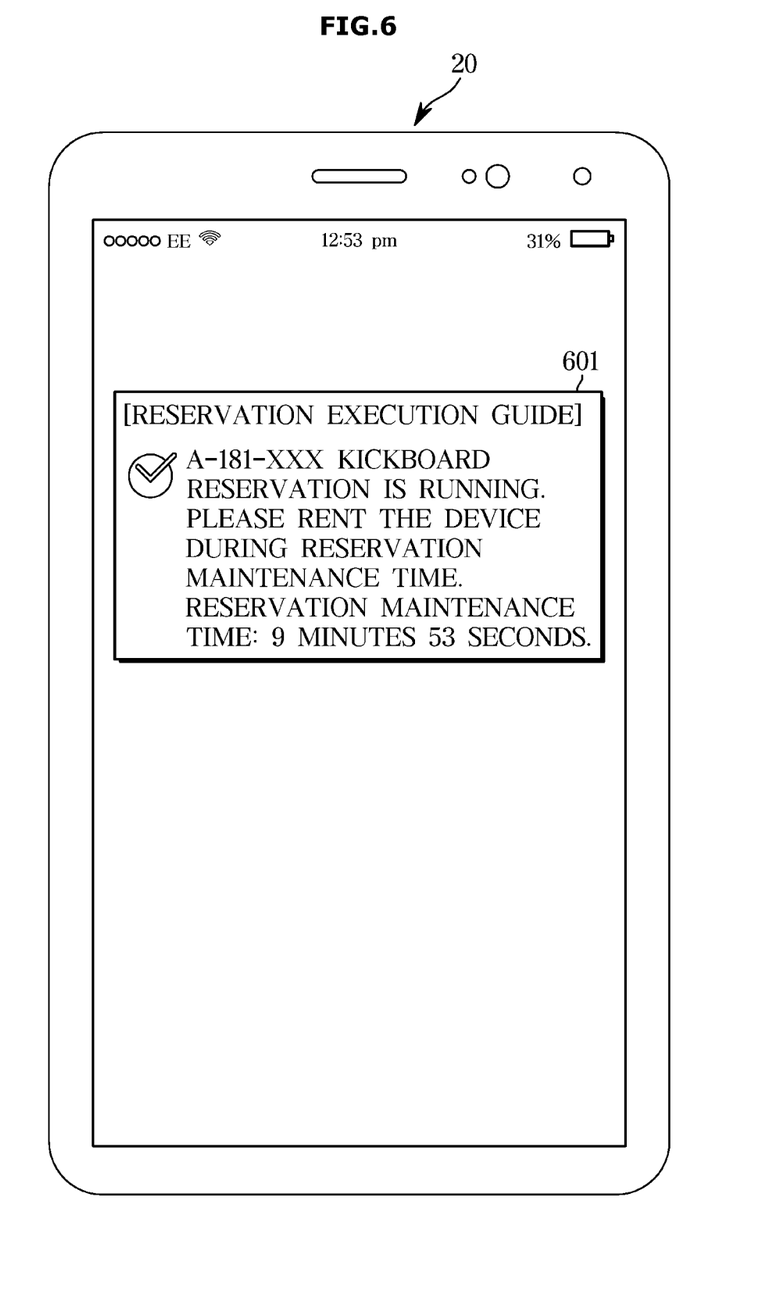

FIGS. 5 and 6 illustrate an example of a screen in which a push message is displayed before an application is executed in a user terminal.

Referring to FIG. 5, the user terminal 20 may display a push message 501 providing a notification regarding recommended reservation information. The server 10 may transmit a push message providing a notification regarding recommended reservation information to the user terminal 20 before the application is executed in the user terminal 20.

For example, the user terminal 20 may display a push message including a query regarding the current date, current time, current traffic information and reservation. The user terminal 20 may output a push message 501 such as "[recommended reservation information]Wednesday, 2019.09.04, evening rush hour. Penn Station is very crowded. Would you like to reserve a kickboard?"

Referring to FIG. 6, when an application is not running in the user terminal 20, the server 10 may transmit a push message guiding reservation execution to the user terminal 20. The user terminal 20 may display a push message 601 that guides reservation execution. For example, the user terminal 20 may display a push message including device information and reservation maintenance time of the confirmed personal mobility 30. The user terminal 20 outputs a push message 601 such as "[reservation execution guide] A-181-XXX kickboard reservation is running. Please rent the device during reservation maintenance time. Reservation maintenance time: 9 minutes 53 seconds."

Figure 7:
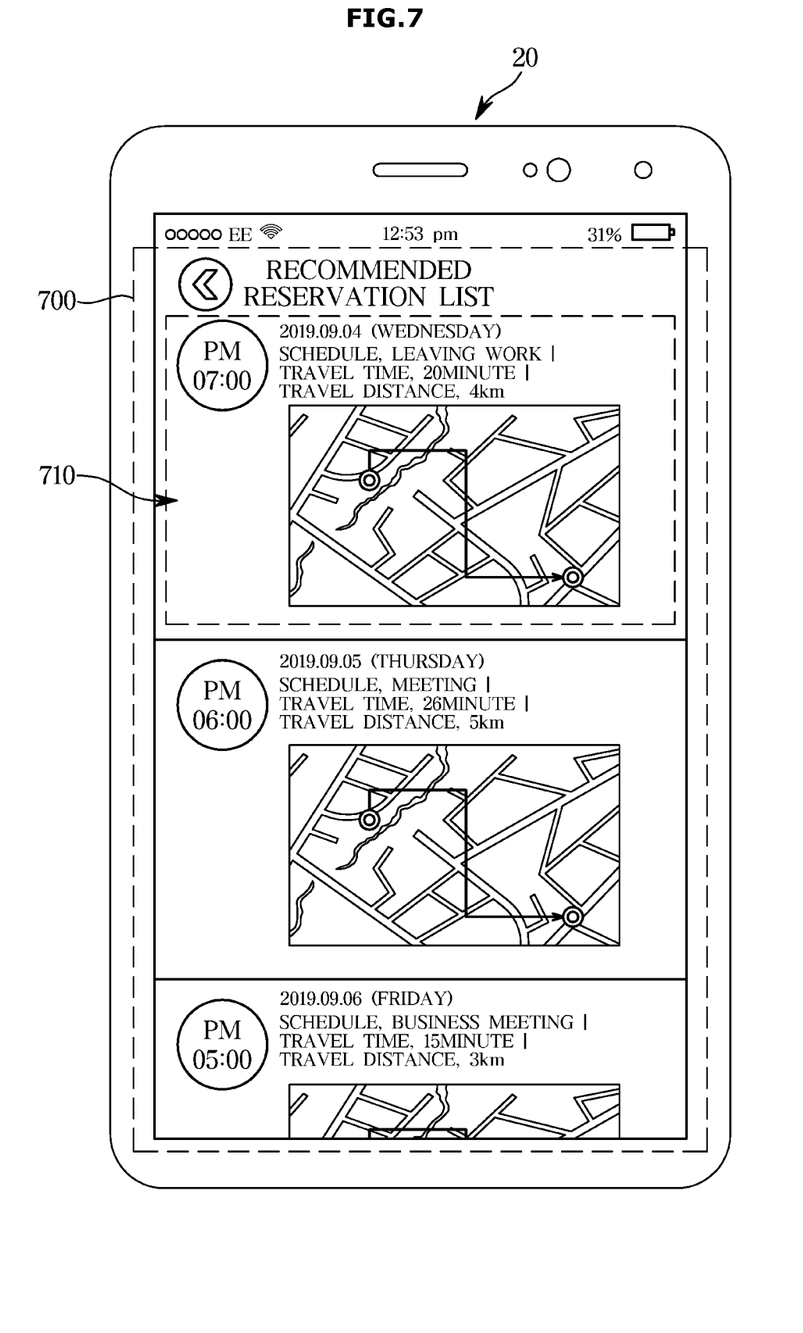
FIG. 7 illustrates an example of a screen in which a list of recommended reservations is displayed after an application is executed in a user terminal.

FIG. 7 illustrates an example of a screen in which a list of recommended reservations is displayed after an application is executed in a user terminal.

When the application is executed in the user terminal 20, a user interface screen for reservation of the personal mobility 30 may be displayed. For example, as illustrated in FIG. 7, the user terminal 20 may display a list 700 of recommended reservation information. The list 700 of recommended reservation information may include a plurality of recommended reservation information 710. Each item of recommended reservation information 710 may include schedule information, driving route, travel distance, and travel time. The driving route may be displayed with a map.

Figure 8:
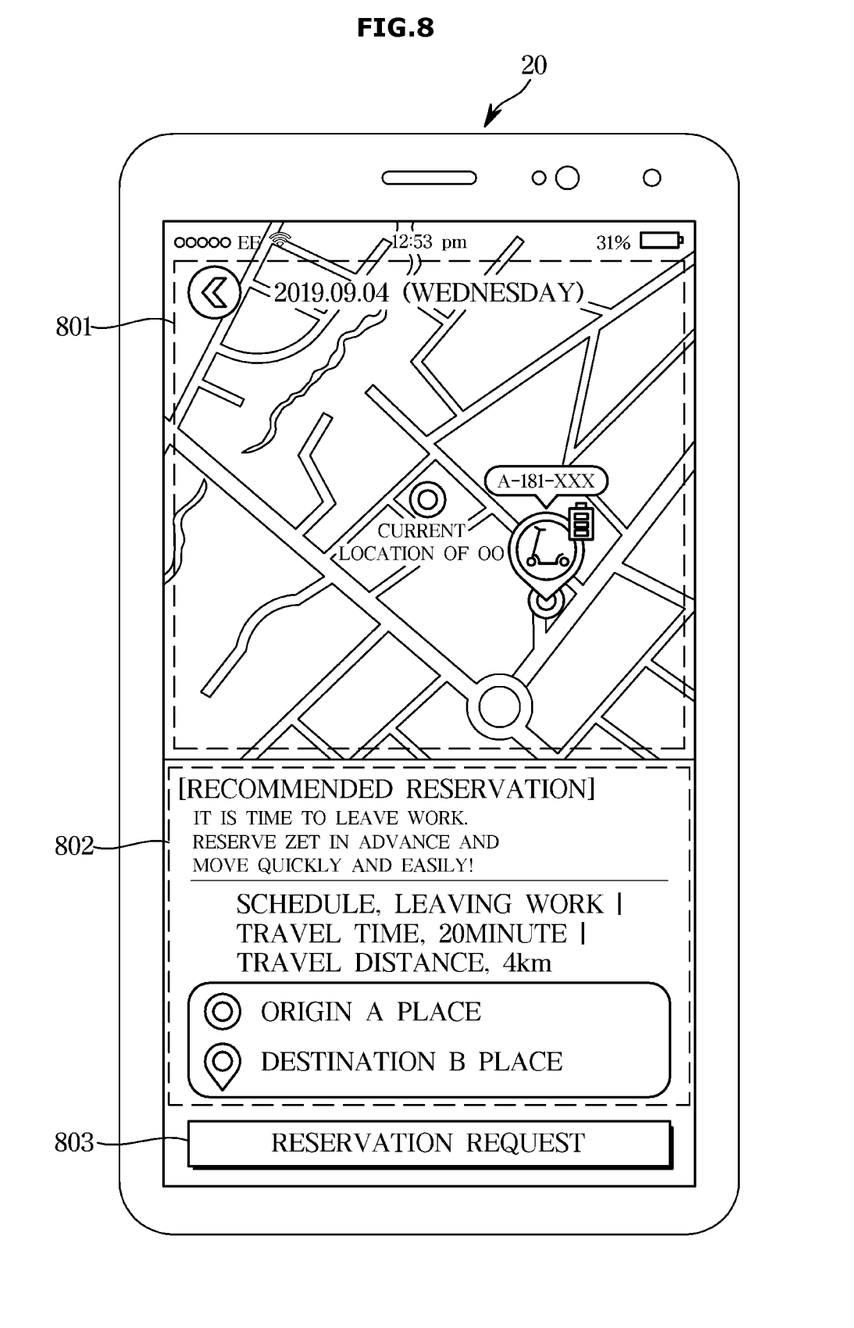
FIG. 8 illustrates an example of a screen in which details of recommended reservation information are displayed after the application is executed in the user terminal.

FIG. 8 illustrates an example of a screen in which details of recommended reservation information are displayed after the application is executed in the user terminal.

Referring to FIG. 8, the user terminal 20 may display details of recommended reservation information. Specifically, the user terminal 20 may display a map 801 indicating the current location of the user and the location of the personal mobility 30 to be reserved. In addition, the user terminal 20 may display a detailed information field 802 including schedule information, travel distance, travel time, origin and destination. The user terminal 20 may display a reservation request button 803.

The details of the recommended reservation information may be displayed by switching the screen of the user terminal 20 when any one of the recommended reservation information options is selected from the list of recommended reservation information of FIG. 7. In addition, the details of the recommended reservation information may be displayed by switching the screen of the user terminal 20 even when the selection signal for the push message 501 of FIG. 5 is input.

In addition, when there is a user input regarding the reservation request button 803, the user terminal 20 may transmit a reservation request signal to the server 10.

Figure 9:
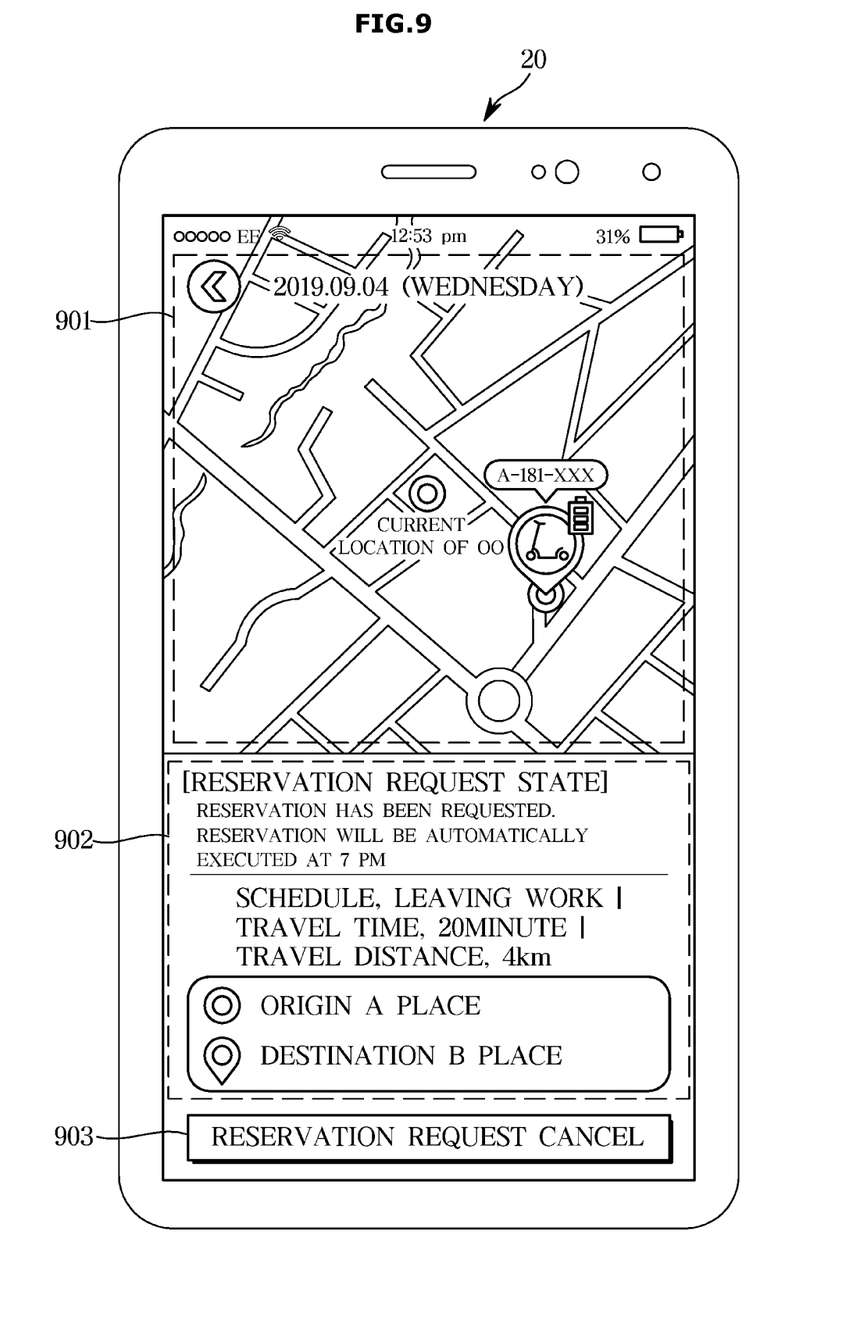
FIG. 9 illustrates an example of a screen related to a reservation request displayed on a user terminal.

FIG. 9 illustrates an example of a screen related to a reservation request displayed on a user terminal.

Referring to FIG. 9, the user terminal 20 may display a reservation request state by switching a screen after a reservation request for recommended reservation information. For example, the user terminal 20 may display a map 901 indicating the current location of the user and the location of the personal mobility 30 to be assigned. In addition, the user terminal 20 may display detailed information fields 902 including schedule information, travel distance, travel time, origin and destination.

In addition, the detailed information field 902 may further include a message that guides reservation execution time. The message guiding the reservation execution time is "Reservation has been requested. Reservation will be automatically executed at 7 PM." The screen for guiding the state of the reservation request may be displayed until immediately before reservation execution.

In addition, the user terminal 20 may display a reservation request cancel button 903. The user terminal 20 may transmit a reservation request cancellation signal to the server 10 when there is a user input regarding the reservation request cancel button 903. The server 10 withdraws the reservation request based on the reservation request cancellation signal.

Figure 10:
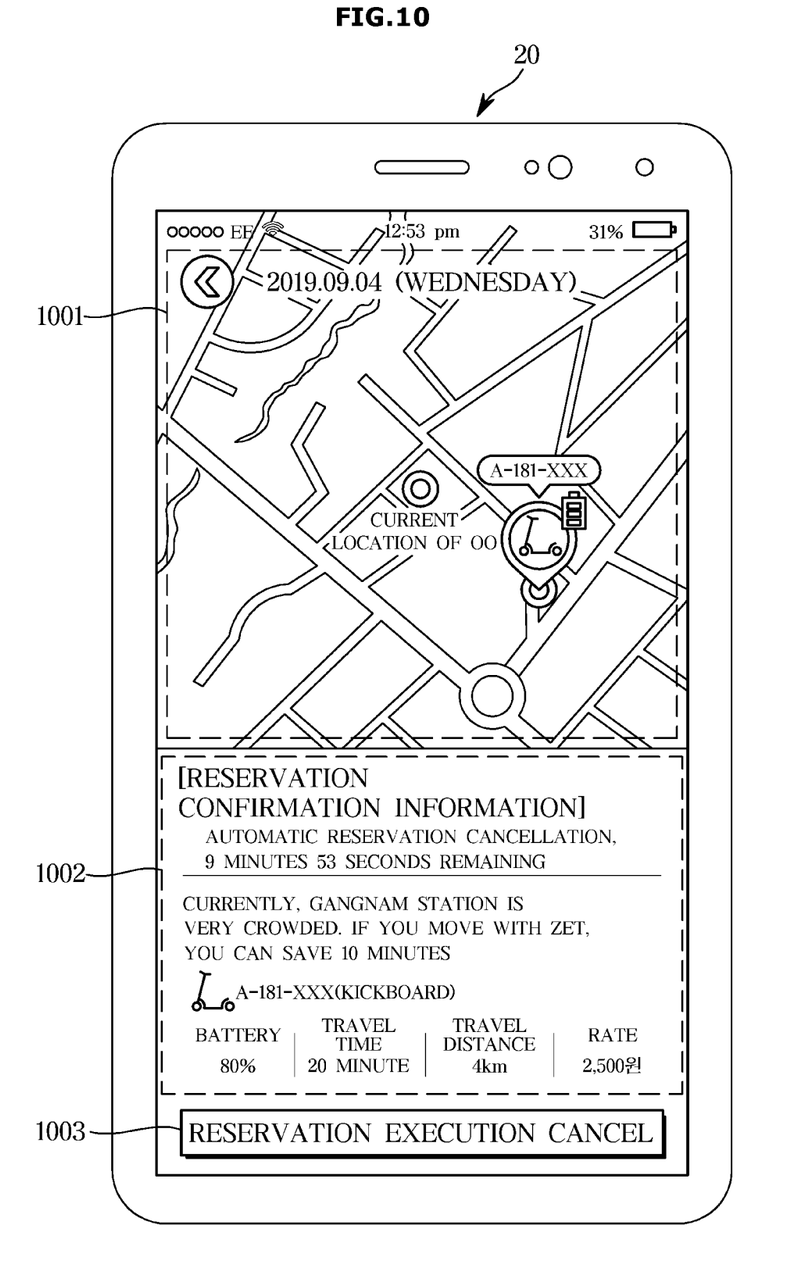
FIG. 10 illustrates an example of a screen related to a reservation execution displayed on a user terminal.

FIG. 10 illustrates an example of a screen related to a reservation execution displayed on a user terminal.

Referring to FIG. 10, when the reservation execution time arrives, the user terminal 20 may display reservation confirmation information. For example, the user terminal 20 may display a map 1001 indicating the current location of the user and the confirmed location of the personal mobility 30. In addition, the user terminal 20 may display a detailed information field 1002 including reservation maintenance time, ID of the confirmed personal mobility 30, battery capacity, travel distance, travel time, and estimated rate.

In FIG. 10, the reservation maintenance time is set to the first 10 minutes and counted down. When a rental signal is not received from the user terminal 20 during the reservation maintenance time or when a cancellation signal of the reservation execution is received from the user terminal 20 during the reservation maintenance time, the server 10 may cancel the reservation regarding the personal mobility 30.

The user terminal 20 may display a reservation execution cancel button 1003. The user terminal 20 may transmit a reservation execution cancellation signal to the server 10 when there is a user input regarding the reservation execution cancel button 1003. The server 10 cancels the confirmed reservation based on the reservation execution cancellation signal.

The disclosed personal mobility reservation system and the reservation method of a personal mobility can predict a scenario related to rental of a personal mobility using a user's schedule and usage history, and recommend reservation of a personal mobility suitable for a user.

In addition, the personal mobility reservation system and the reservation method of a personal mobility can reduce the hassle of a user searching for a personal mobility and prevent a rental failure.

Meanwhile, the disclosed embodiments may be implemented in the form of a storage medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A personal mobility reservation system comprising:
a personal mobility that is powered by electricity; and
a server that includes a processor coupled to a memory, the server connected to the personal mobility and a user terminal through a network, wherein the server is configured to:
obtain user information from the user terminal;
obtain device information from the personal mobility;
generate recommended reservation information based on at least two of the user information, the device information and traffic information;
predict a rental time point based on the user information;
transmit the recommended reservation information to the user terminal;
perform a reservation of the personal mobility based on a reservation request signal received from the user terminal regarding the recommended reservation information, wherein the user terminal is installed with applications and/or programs for performing reservation of the personal mobility;
transmit a push message providing a notification regarding the recommended reservation information to the user terminal before an application is executed in the user terminal, the push message being transmitted at a time ahead of a predetermined rental time point based on the predicted rental time point;
transmit list data of the recommended reservation information to the user terminal when the application is executed in the user terminal;
calculate a reservation maintenance time based on a distance from a location of the user terminal to the personal mobility; and
cancel the reservation regarding the personal mobility when a rental signal is not received from the user terminal during the reservation maintenance time or when a cancellation signal of a reservation execution is received from the user terminal during the reservation maintenance time;
wherein the personal mobility is configured to:
transmit the device information to the server; and
receive the reservation to become available for use by a user after the reservation is performed by the server unless the reservation has been canceled.

2. The system according to claim 1, wherein the server is configured to generate the recommended reservation information based on schedule data and usage history data comprised in the user information, and location information and battery information of the personal mobility comprised in the device information.

3. The system according to claim 2, wherein the server is configured to set a reservation execution time and the reservation maintenance time based on the user information and the device information when receiving the reservation request signal.

4. The system according to claim 3, wherein the server is configured to confirm allocation of the personal mobility at the reservation execution time.

5. The system according to claim 1, wherein the recommended reservation information comprises a destination predicted based on the user information, a driving route to the destination, and an estimated rate.

6. A reservation method of a personal mobility performed by a user terminal, the personal mobility and a server connected through a network, wherein the personal mobility is powered by electricity and wherein the user terminal is installed with applications and/or programs for performing reservation of the personal mobility, the method comprising:
   sending user information from the user terminal to the server;
   sending device information from the personal mobility to the server;
   receiving traffic information at the server;
   generating, by the server, recommended reservation information based on at least two of the user information, the device information and the traffic information;
   predicting, by the server, a rental time point based on the user information;
   transmitting the recommended reservation information from the server to the user terminal by transmitting a push message providing a notification regarding the recommended reservation information to the user terminal before an application is executed in the user terminal and before a predetermined rental time point based on the predicted rental time point;
   after receiving the push message from the server, executing an application in the user terminal;
   transmitting list data of the recommended reservation information from the server to the user terminal after the application is executed in the user terminal;
   sending a reservation request signal for the recommended reservation information from the user terminal to the server based on the transmitted list data of the recommend reservation information;
   setting, by the server, a reservation maintenance time based on a distance from a location of the user terminal to a location of the personal mobility;
   performing, by the server, a reservation of the personal mobility based on the reservation request signal and the reservation maintenance time; and
   canceling, by the server, the reservation when a rental signal is not received from the user terminal during the reservation maintenance time or when a cancellation signal of a reservation execution is received from the user terminal during the reservation maintenance time.

7. The method according to claim 6, wherein generating the recommended reservation information comprises generating the recommended reservation information based on schedule data and usage history data comprised in the user information, and location information and battery information of the personal mobility comprised in the device information.

8. The method according to claim 7, wherein performing the reservation of the personal mobility comprises setting a reservation execution time based on the user information and the device information when receiving the reservation request signal.

9. The method according to claim 8, wherein performing the reservation of the personal mobility comprises confirming allocation of the personal mobility at the reservation execution time.

10. The method according to claim 6, wherein the recommended reservation information comprises a destination predicted based on the user information, a driving route to the destination, and an estimated rate.

11. A reservation method of a personal mobility performed by a user terminal, the personal mobility and a server connected through a network, the method comprising:
   obtaining user information from the user terminal;
   obtaining device information from the personal mobility;
   generating recommended reservation information based on at least two of the user information, the device information and traffic information;
   predicting a rental time point based on the user information;
   transmitting the recommended reservation information to the user terminal by transmitting a push message providing a notification regarding the recommended reservation information to the user terminal before an application is executed in the user terminal and before a predetermined rental time point based on the predicted rental time point;
   transmitting list data of the recommended reservation information to the user terminal when the application is executed in the user terminal;
   receiving a reservation request signal for the recommended reservation information from the user terminal;
   setting a reservation maintenance time based on a distance from a location of the user terminal to a location of the personal mobility;
   performing a reservation of the personal mobility based on the reservation request signal and the reservation maintenance time; and
   canceling the reservation when a rental signal is not received from the user terminal during the reservation maintenance time or when a cancellation signal of a reservation execution is received from the user terminal during the reservation maintenance time;
   wherein generating the recommended reservation information comprises generating the recommended reservation information based on schedule data and usage history data comprised in the user information, and location information and battery information of the personal mobility comprised in the device information;
   wherein the recommended reservation information comprises a destination predicted based on the user information, a driving route to the destination, and an estimated rate; and
   wherein the method further comprises:
      retrieving, by a user, the personal mobility when the reservation has been performed; and
      operating, by the user, the personal mobility so that the personal mobility is from the location of the personal mobility to a different location.

12. The method according to claim 11, wherein performing the reservation of the personal mobility comprises setting a reservation execution time based on the user information and the device information when receiving the reservation request signal.

13. The method according to claim 12, wherein performing the reservation of the personal mobility comprises confirming allocation of the personal mobility at the reservation execution time.

14. The system according to claim 2, wherein the recommended reservation information comprises a destination predicted based on the user information, a driving route to the destination, and an estimated rate.

15. The system according to claim 3, wherein the recommended reservation information comprises a destination predicted based on the user information, a driving route to the destination, and an estimated rate.

16. The system according to claim 4, wherein the recommended reservation information comprises a destination predicted based on the user information, a driving route to the destination, and an estimated rate.

17. The system according to claim 1, wherein the personal mobility comprises a scooter.

18. The system according to claim 2, wherein the personal mobility comprises a scooter.

19. The system according to claim 3, wherein the personal mobility comprises a scooter.

20. The system according to claim 4, wherein the personal mobility comprises a scooter.

\* \* \* \* \*